2,773,858
METHOD OF PREPARING EXPANDED UREA

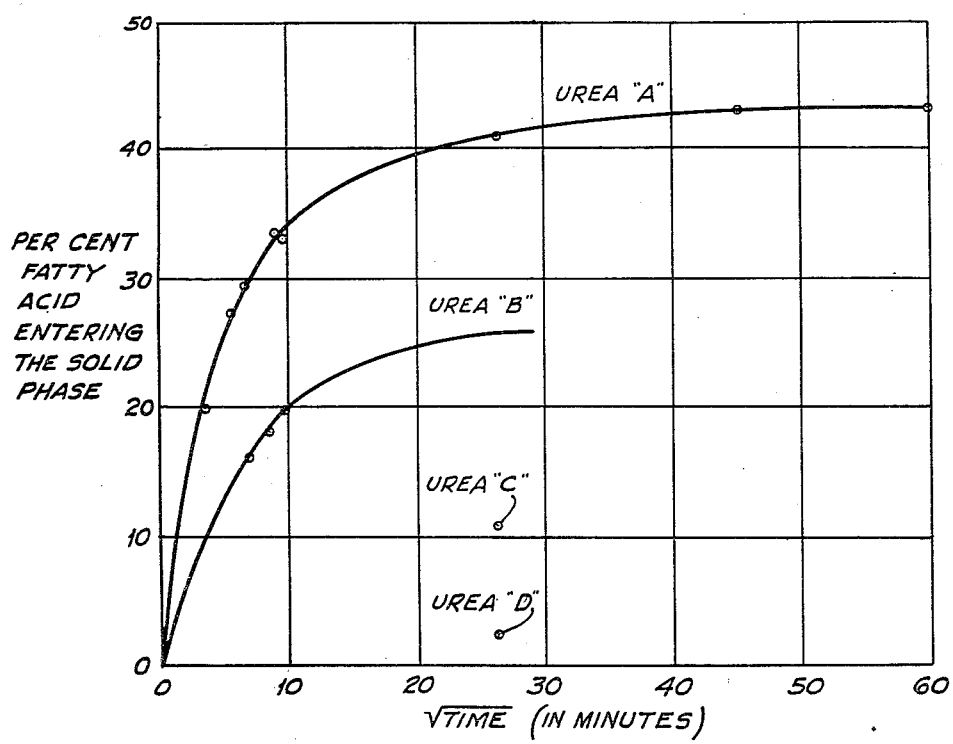

Manuel H. Gorin and Ludwig Rosenstein,
San Francisco, Calif.

Application March 27, 1950, Serial No. 152,178

1 Claim. (Cl. 260—96.5)

This invention relates to the production of and to a new form of urea which differs from urea in its well-known crystalline form with respect to its activity towards fatty acids and towards certain hydrocarbons. Urea has the ability to combine with fatty acids and with certain paraffinic hydrocarbons at ordinary temperatures to form solid phases. Whether or not such solid phases are definite compounds, solid solutions, or some other form of combination is not known to us and is not germane to the present invention. The fact is that solid phases containing urea and fatty acids or hydrocarbons do form when the mentioned components are brought together under certain conditions. When ordinary urea is used, one of the conditions for its successful use is that an accelerator must be present to cause the solid phase to form at a rate which is practical in commercial operation. In general, urea solvents, other than water, act as such accelerators and, more specifically, methanol is an efficient accelerator. However, when that form of urea which we have discovered is employed, no accelerator is necessary, a feature of obvious advantage since it need not be processed and recovered for re-use. This special form of urea will hereafter be referred to herein and in the claim as "expanded urea" and evidence will be presented to show that it is a new form of urea and not merely the well-known urea in a state of fine division.

The following is a broad statement of the principles involved in making expanded urea.

Ordinary urea is first caused to react with a suitable fatty acid or suitable hydrocarbon and with the aid of a urea solvent other than water to form a solid phase, which is then removed by filtration or other convenient means and washed with a neutral solvent. It is then decomposed by suspending in a neutral solvent and raising the temperature sufficiently to decompose the solid phase but not melt the urea; by "neutral solvent," we mean one that is not a solvent for urea, but is a solvent for the other component or components of the urea-solid phase and which are released upon elevation of the temperature. At an elevated temperature, the solid phase will separate into its components; the urea will remain as a finely divided solid and the other component or components will go into solution in the neutral solvent. The solid urea is then removed, as by filtration, and may be washed with neutral solvent. The urea so obtained is the expanded urea of this invention; it is a light and fluffy powder and will be found to be readily reactive towards certain fatty acids and hydrocarbons without the aid of any added accelerator.

It has a bulk density of approximately 0.45 gram per cubic centimeter and in any case not exceeding 0.5 gram per cubic centimeter. Ordinary urea of either reagent or commercial grade after grinding has a bulk density of approximately 0.75 gram per cubic centimeter. No degree of grinding alters it to less than about 0.70 gram per cubic centimeter.

Bulk density was measured by adding successive small portions to a 50 cc. graduated cylinder, being careful to jar and tap the cylinder after each addition. When approximately 20 cubic centimeters had been added, the cylinder was jarred and tapped until no further change in volume was observed. Weight and volume were then measured in the usual manner.

The following examples are set forth as illustrative of the preparation of expanded urea, but the invention is not limited thereto.

*Example I.*—Preparation of expanded urea with a pure fatty acid: Sufficient commercial lauric acid was dissolved in a mixture of 100 volumes of iso-octane and approximately 16 volumes of anhydrous methanol, to make a solution of approximately 10% lauric acid by weight. To this, approximately 3.3 parts by weight of ordinary commercial urea were added for each weight unit of lauric acid. The mixture was agitated at ordinary room temperature for about one hour. The solid was filtered, washed with a neutral solvent, and suspended in toluol; the temperature was then raised to the boiling point of toluol (110° C.) and maintained for about 15 minutes. The liquid phase was removed while hot; the urea was collected and washed with hot toluol. The filtrate from the urea can be used repeatedly to make additional batches of expanded urea.

*Example II.*—Preparation of expanded urea with a hydrocarbon: Sufficient paraffin wax (M. P. 45° C.) was dissolved in a methanol-toluol mixture containing about 30% by volume methanol to make a 20% solution. To this was added 2.4 weights of urea per weight of paraffin wax. The mixture was agitated one hour at 19°–20° C. The solid phase was filtered, washed with a neutral solvent, and then suspended in toluol. It was raised to the boiling point (110° C.) for about thirty minutes and then filtered hot. The solid phase was our expanded urea, and it is of especial interest to note that this expanded urea, prepared by using a hydrocarbon, was also active towards fatty acids. Conversely, we have found that our expanded urea, prepared by using a fatty acid, will form a solid phase without the need of an accelerator, with hydrocarbons capable of forming, under suitable and known conditions, a solid-phase with ordinary urea.

Expanded urea can also be made by a direct precipitation of the urea-organic complex from a urea solvent which also dissolves fatty-acids, and then decomposing the solid complex, as previously described. The methanol accelerator used in the two preceding examples is convenient in that it reduces the time necessary to form the urea-fatty acid or paraffine solid phase. However, this solid phase can also be formed by a long continued contact of ordinary urea with suitable fatty acids or hydrocarbons in solution in neutral solvent. Thermal decomposition of solid-phase thus formed also gives rise to expanded urea. The following example is cited to show this:

*Example III.*—Preparation of expanded urea without the use of an accelerator: A quantity of cottonseed fatty acid was dissolved in sufficient hexane to make a solution containing 200 grams fatty acid per litre. To 250 ml. of this solution were added 20 grams of Merck reagent urea. The temperature was raised to 40° C. and the material kept well agitated in a closed vessel for approximately twelve hours. At the end of this period the solid phase was removed by filtration, washed with warm hexane and finally decomposed at 110° C. with boiling toluol for a period of fifteen minutes. The solid urea was filtered and washed with hot toluol. It was found to consist of expanded urea and capable of rapid interaction to form solid phase with fatty acids and with linear hydrocarbons such as those occurring in paraffin wax.

The above directions of Examples I, II and III need not be strictly adhered to for the process is simple and none of the conditions named is critical. The aim is to form a solid phase urea-organic compound at a low temperature and decompose it at a higher temperature, but below the melting point of urea and in the presence of a solvent for the organic compound which is not a solvent for urea so that the bulk of the compound is separated from the urea solid phase. It will be obvious to those skilled in the art that this process of making expanded urea can be continuous and that fatty acids other than lauric acid, and that hydrocarbons other than paraffin wax, can be employed; in fact, expanded urea can be prepared by utilizing any organic compound forming a solid phase with urea and decomposing the solid phase at a temperature below the melting point of urea, and in a solvent wherein urea is not soluble.

*Example IV.*—Urea in four different forms was used. These were:

a. Expanded urea prepared as described in Example I.

b. Expanded urea prepared as described in Example I except that it was maintained in toluol at 110° C. for 150 minutes instead of 15 minutes.

c. Merck reagent urea ground to an impalpable powder.

d. Merck reagent urea.

For the test substance, we used a commercial product known as "double distilled cottonseed fatty acids." This material has the following approximate composition:

| | |
|---|---|
| Stearic and palmitic acids | percent 33 |
| Oleic acid | do 23 |
| Linoleic and linolenic acid | do 44 |
| Acid number | 200 |
| Iodine number | 105 |
| Titer | °C 38 |

Solution of this material was made up in hexane to contain 50 grams per 250 ml. solution; equal amounts of the four forms of urea were introduced into separate equal portions of the fatty and hexane solutions. The suspensions were kept well agitated in closed vessels at 20° C. At various times, samples of the clear liquid were taken and the fatty acid content thereof determined by titration with standard KOH in the usual manner. From the results, the percent fatty acids which had combined was calculated. Table I gives the results and Figure 1 in the accompanying drawing shows them graphically.

tive as the finely ground urea (C), on the basis of the time required for conversion.

The fact that urea with different degrees of activity within the range of practical use can be prepared is of importance in the development of processes for separating the components of fatty acid mixtures or of hydrocarbons. The most reactive urea is by no means always the most desirable. A highly reactive urea will combine with fatty acids or hydrocarbons so fast that it is likely to set up as a solid mass and, moreover, a control of the reaction so as to achieve selectivity is almost impossible unless the reaction time is slow enough so that selectivity can be accomplished by limiting the time of contact. Towards any given sample of expanded urea, the saturated fatty acids are most reactive, the unsaturated acids with a single double bond less so; and the unsaturated acids with multiple double bonds least. The following example illustrates the achievement of a selective separation of such a mixture.

*Example V.*—Samples of the expanded urea previously designated A and B (Table I), were brought into contact with a hexane solution of cottonseed fatty acids (50 g. fatty acids in 250 ml. total volume) for 15 minutes. The solid phase was filtered, washed with hexane and finally decomposed with water whereby the fatty acids were liberated. Their melting points and amounts were determined:

| | °C. | Percent F. A. in Solid Phase |
|---|---|---|
| Melting point of fatty acids from Urea A | 40 | 10.1 |
| Melting point of fatty acids from Urea B | 47 | 5.3 |

*Example VI.*—40 grams of a commercially available "double distilled cottonseed fatty acids" of the composition given above were dissolved in 100 cc. of commercial hexane. Five 24 gram portions of an expanded urea, prepared by contacting a urea-cottonseed fatty acid complex with boiling toluol for about 90 minutes, were added successively to this hexane solution of cottonseed fatty acids. After each addition of expanded urea the mixture was agitated for 30 minutes at 20° C., then filtered, washed

*Table I*

| Expanded Urea A | | Expanded Urea B | | Ground Urea C | | Reagent Urea D | |
|---|---|---|---|---|---|---|---|
| Elapsed Time, Minutes | F. A. to Solid Phase, Percent[1] | Elapsed Time, Minutes | F. A. to Solid Phase, Percent[1] | Elapsed Time, Minutes | F. A. to Solid Phase, Percent[1] | Elapsed Time, Minutes | F. A. to Solid Phase, Percent[1] |
| 14 | 20 | ------ | ------ | 15 | 0 | 16 | 0 |
| 34 | 27.6 | ------ | ------ | 34 | 0 | 33 | 0 |
| 52 | 29.4 | 44 | 16.0 | 54 | 0 | 51 | 0 |
| 76 | 33.6 | 67 | 17.8 | 75 | 0 | 72 | 0 |
| 94 | 33.2 | 97 | 19.8 | ------ | ------ | ------ | ------ |
| [2] 704 | 41.1 | ------ | ------ | [2] 699 | 11 | [2] 689 | 2.4 |
| [2] 20,40 | 43.3 | ------ | ------ | ------ | ------ | ------ | ------ |
| [2] 3,600 | 43.2 | ------ | ------ | ------ | ------ | ------ | ------ |

[1] Mol percent.
[2] Allowed to stand without agitation.

Certain facts are apparent from these data. In the case of expanded urea (A), prepared by 15 minute exposure to 110° C., 33% of the fatty acids had reacted after 76 minutes, while neither the finely ground urea (C), nor the ordinary urea (D), showed any measurable reaction. However, after a long period of standing, the finely ground urea (C) reacted with 11% of the fatty acids, while the reagent urea (D) reacted with 2.4% of the fatty acids. These amounts were taken up by expanded urea (A) in less than 5 minutes. Comparing the expanded urea (B), prepared with 150 minutes at 110° C., we see that it is approximately one-sixth as active as active urea (A), the material which had only 15 minutes' thermal decomposition, but it is still many times as reactive with hexane and evaporated at room temperature back to its original volume. In each case the solid phase was decomposed with water and the fatty acids extracted with benzene and recovered by evaporation of the benzene and their titer determined. The results are given in Table II:

*Table II*

| Addition of Urea | Fatty Acids Taken Up, percent | Titer of Fatty Acids Obtained, °C. |
|---|---|---|
| 1st | 11.5 | 48.8. |
| 2nd | 11.5 | 48.7. |
| 3rd | 9.5 | 48.1. |
| 4th | 1.75 | (soft solid). |
| 5th | 2.25 | Do. |

It is noteworthy that the reaction proceeded rapidly and gave a high titer product of apparently nearly constant composition until about 32.5% of the fatty acids were removed, after which the rate of reaction and the titer of the product dropped sharply. Since the saturated fatty acid content of the cottonseed fatty acids was 33%, it is evident that these acids are taken up very selectively and much more rapidly than the unsaturated acids by the expanded urea.

Urea B of Example V was less reactive, as shown by the lesser amount of fatty acids recovered, but while the less expanded urea has taken up only approximately half as much of the fatty acids, the melting point of the acids taken up was 7° C. higher, indicating that in the 15 minutes the less expanded urea had time to combine only, or nearly so, with higher melting fatty acids whereas the more expanded urea had combined with these and as well with some having lower melting points.

While the above Examples V and VI point to differences of reactivity of expanded urea achieved by changing the time of contact with hot toluol, similar differences of reactivity can be achieved by changing the temperature. In the latter case, however, another phenomenon comes into consideration. The solid phases formed between urea and fatty acids or hydrocarbons have different degrees of temperature stability; in other words, different decomposition temperatures, and to achieve complete liberation of fatty acids or hydrocarbons from a given solid phase, the decomposition temperature of the highest member must be exceeded. Partial and selective decomposition can be achieved in the temperature range below the decomposition temperature, and urea thus produced has varying degrees of reactivity.

The differences in reaction rates towards fatty acids of expanded urea and ordinary urea, whether finely divided or not, is evidence that these are different forms of urea, we present as further evidence the large difference in bulk density of expanded urea over that of ordinary urea.

We believe that when urea combines with fatty acids, or hydrocarbons, these latter penetrate the crystal lattice and cause it to expand, thus changing the fundamental dimensions. When the solid phase is decomposed as described, an expanded form of lattice is produced. Suitable substances can now more readily penetrate the lattice, hence the reactivity of our expanded urea. Such active urea loses its reactivity on long standing at ordinary temperature or more rapidly at higher temperature, and we interpret this as the gradual return of the expanded lattice to the normal lattice of crystalline urea. In other words, the expanded urea is metastable and tends to return to the stable form.

We claim:

A process for making expanded urea in the form of a light and fluffy powder having a bulk density of less than substantially 0.5 gram per cubic centimeter, which comprises first preparing a urea adduct by reacting urea at room temperature with an organic compound from the group consisting of linear hydrocarbons and fatty acids containing a linear paraffinic chain of at least seven carbon atoms, removing the solid phase by filtration, washing the solid phase with warm hexane, suspending the resulting adduct in a solvent for the organic compound but a non-solvent for urea, decomposing the adduct by heating the suspension to a temperature below about 115° C. and above about 40° C. for a time between 5 minutes and 90 minutes, and then separating the resulting expanded urea.

References Cited in the file of this patent

UNITED STATES PATENTS

| | | |
|---|---|---|
| 2,466,574 | Cavallito et al. | Aug. 10, 1948 |
| 2,499,820 | Fetterly | Mar. 7, 1950 |
| 2,518,677 | Garner et al. | Aug. 15, 1950 |
| 2,520,715 | Fetterly | Aug. 29, 1950 |
| 2,520,716 | Fetterly | Aug. 29, 1950 |
| 2,549,372 | Fetterly | Apr. 17, 1951 |
| 2,577,202 | Lien et al. | Dec. 4, 1951 |
| 2,578,054 | Fetterly | Dec. 11, 1951 |
| 2,613,204 | Fetterly | Oct. 7, 1952 |
| 2,634,261 | Fetterly | Apr. 7, 1953 |
| 2,670,343 | Fetterly | Feb. 23, 1954 |

OTHER REFERENCES

Bengen: Technical Oil Mission Reel 143 (deposited in Library of Congress May 22). See also P. B. 1742 Feb. 1, 1946.